United States Patent [19]

Marneffe et al.

[11] Patent Number: 4,562,628
[45] Date of Patent: Jan. 7, 1986

[54] METHOD FOR MANUFACTURING MULTILAYER CERAMIC CAPACITORS

[75] Inventors: Antonius C. Marneffe, Geldrop; Frederik G. A. Persoon; Gerard J. Scholten, both of Eindhoven, all of Netherlands

[73] Assignee: U.S. Philips Corporation, New York, N.Y.

[21] Appl. No.: 646,679

[22] Filed: Sep. 4, 1984

[30] Foreign Application Priority Data

Apr. 25, 1984 [NL] Netherlands ............. 8401320

[51] Int. Cl.[4] .................................... H01G 7/00
[52] U.S. Cl. ........................ 29/25.42; 29/411; 29/412; 29/413; 125/23 C; 225/2; 225/96; 225/97
[58] Field of Search ............. 29/25, 42, 411–414; 225/2, 96, 97, 103; 125/23 C, 23 R; 310/357, 358; 361/320, 321

[56] References Cited

U.S. PATENT DOCUMENTS

| 475,214 | 5/1892 | Gilgenberg | 225/96 |
| 1,117,926 | 11/1914 | Stroud | 125/23 C |
| 2,365,902 | 12/1944 | Powers | 225/2 |
| 2,958,117 | 11/1960 | Robinson et al. | 29/25.42 |
| 3,195,225 | 7/1965 | Belloveau et al. | 29/413 |
| 3,304,475 | 2/1967 | Gowen et al. | 29/412 |
| 3,324,212 | 6/1967 | Paulley et al. | 29/830 |
| 3,469,294 | 9/1969 | Hayashi et al. | 29/25.42 |
| 3,617,834 | 11/1971 | Rayburn | 29/25.42 |
| 4,424,615 | 1/1984 | Wakino | 29/25.42 |

FOREIGN PATENT DOCUMENTS 1147642  6/1983  Canada ........................ 225/97

Primary Examiner—Howard N. Goldberg
Assistant Examiner—P. W. Echols
Attorney, Agent, or Firm—Norman N. Spain

[57] ABSTRACT

A method and a device for manufacturing multilayer ceramic capacitors, in which a plate of ceramic material composed of several layers is subdivided in the green non-sintered state into separate capacitor elements. For this purpose, by means of notching members, notches of a given depth are provided simultaneously on both sides of the plate in such a manner that spontaneous ruptures are obtained through the remaining thickness of the plate. Due to this method, the contamination of the exposed electrode layers and delamination are avoided. By the use of a frame with resilient walls, the already separated capacitor elements are held together until the notching process has been carried out completely.

3 Claims, 9 Drawing Figures

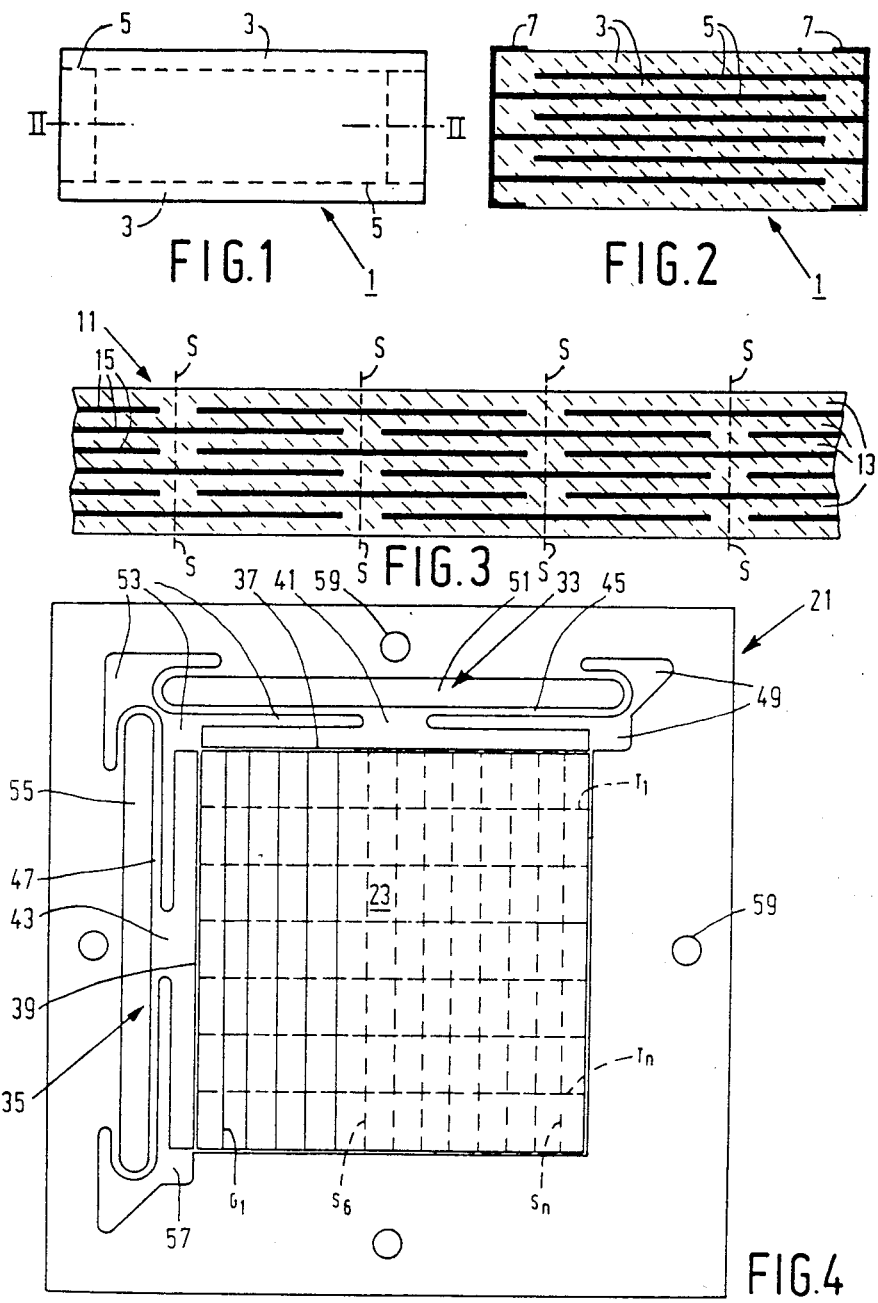

METHOD FOR MANUFACTURING MULTILAYER CERAMIC CAPACITORS

BACKGROUND OF THE INVENTION

Field of the Invention

The invention relates to a method of manufacturing multilayer ceramic capacitors, in which electrode layers of electrode material are locally applied to sheets of dielectric ceramic material, the sheets provided with electrode layers are stacked and compressed to form a laminated plate and this plate is then subdivided into separate capacitor elements in such a manner that successive electrode layers are exposed at opposite end faces of the capacitor elements, after which the capacitor elements are sintered and are provided with an electrically conducting layer on the said end faces.

Such a method is known from U.S. Pat. No. 3,617,834. In this known method, stacked layers of electrode material and ceramic material are subdivided into individual capacitor components by cutting or by another known manner not described further; this is effected, for example, by sawing, stamping and the like. When the green ceramic material, which is soft and brittle, is subjected to cutting, stamping or sawing, material crumbles off, is displaced and is smeared onto at the cutting surfaces, as a result of which the exposed electrode layers are contaminated and contacting of these layers with the electrically conducting layer to be applied later is poor and difficult. Moreover, when the said cutting processes are used, the risk of delamination is fairly high.

SUMMARY OF THE INVENTION

The invention has for its object to provide a method which permits the subdividing a plate composed of layers of ceramic material locally coated with electrode material into separate capacitor elements in an efficacious manner and without contamination of the cutting surfaces.

According to the invention, this object is mainly achieved by notching the plate along division lines and on both sides simultaneously in such a manner that along the notched division lines a spontaneous rupture occurs through the remaining thickness of the plate.

Due to the step according to the invention, the plate is subdivided into separate capacitor elements without material crumbling off, without loss of material without delamination of the layer and without contamination of the separation surfaces. The term "notching" is to be understood herein to mean forming an indentation to a comparatively small depth. By notching, a compressive stress is built up in the soft brittle ceramic material, which, when a given maximum is reached, leads to a spontaneous rupture with aesthetic and clean rupture surfaces. When notching takes place on both sides simultaneously, the rupture is defined and localized comparatively accurately.

Due to the fact that in a preferred embodiment of the method according to the invention, the plate is notched on each side at most to a depth equal to 10% of the thickness of the plate, on the one hand a sufficient stress is built up for obtaining a spontaneous rupture, while on the other hand the number of electrode layers that is notched is limited to a minimum. In most cases, a plate comprises 25 to 30 ceramic layers each having a thickness of approximately 50 $\mu$m. The maximum notching depth then corresponds per side to the thickness of two to three layers.

Another preferred embodiment of the method according to the invention is characterized in that the plate is arranged in a resilient frame and is then notched stepwise in a first direction and subsequently in a second direction at right angles to the first direction, after which the capacitor elements thus obtained are removed from the resilient frame and are subjected to the subsequent operations. Due to the steps of notching and rupturing, the plate is lengthened in a direction at right angles to the division lines; due to the fact that the notching process is carried out stepwise, the plate has the opportunity to expand gradually within the risk of delamination and without damage to the separate capacitor elements. This elongation of the plate is of course also obtained during notching in the said second direction. The distance between the successive division lines is substantially equal to the dimension of the separate capacitor elements in the respective directions. When during notching the plate is arranged in a resilient frame, the elongations of the plate occurring due to the notching process are neutralized and the individual capacitor elements already separated are held together so that the notching process can be effected without disturbance.

A multilayer ceramic capacitor manufactured by the method according to the invention is characterized more particularly by a satisfactory connection of the electrode layers with the electrically conducting layers formed on the end faces.

The invention also relates to a device for carrying out the method; according to the invention, this device is characterized by an upper die and a lower die, which can be displaced relative to each other and which each comprise two notching blocks and a notching member, which device is further characterized by a carriage which is displaceable between the two dies and serves as a carrier for a frame which has a central quadrangular opening, of which two adjacent walls at right angles to each other are of resilient construction. By this device, the method can be carried out in a desired manner without disturbance. Preferably, the carriage is driven stepwise by a stepping motor, the two notching members being moved towards each other in synchronism with the stationary periods of the carriage and providing rectilinear parallel notches in a multilayer ceramic plate arranged in the frame; at a second stage, either on the same device or on a second similar device, a second series of notches is provided in the plate in a direction at right angles to the first series. The synchronization of the set-up movement of the carriage and of the notching movement of the notching members is obtained in a known conventional manner.

A preferred embodiment of the device according to the invention is characterized in that the resilient walls of the frame are each constituted by an elongate wall portion which faces the central opening and is connected by means of a central bridge portion to a rib limited by recesses and acting as a spring. Due to this step, a simple and robust resilient construction of the frame is obtained without separate parts.

In another preferred embodiment of the device according to the invention, the notching members have a blunt dull notching edge having, viewed in cross-section, a width of at least 30 $\mu$m. Experiments have shown that with the use of notching members, whose notching edge has the characteristic blunt shape, the desired spontaneous ruptures are obtained which have a regular appearance and in which the rupture surfaces do not crumble off.

BRIEF DESCRIPTION OF THE DRAWINGS

The invention will be described more fully, with reference to the drawing. In the drawing:

FIG. 1 shows a multilayer ceramic capacitor of known construction;

FIG. 2 shows the capacitor in a longitudinal sectional view taken on the line II—II in FIG. 1;

FIG. 3 is a longitudinal sectional view of a multilayer plate to be subdivided into separate capacitor elements;

FIG. 4 shows a tool used in carrying out the method according to the invention;

DESCRIPTION OF THE PREFERRED EMBODIMENTS

Figure 5:
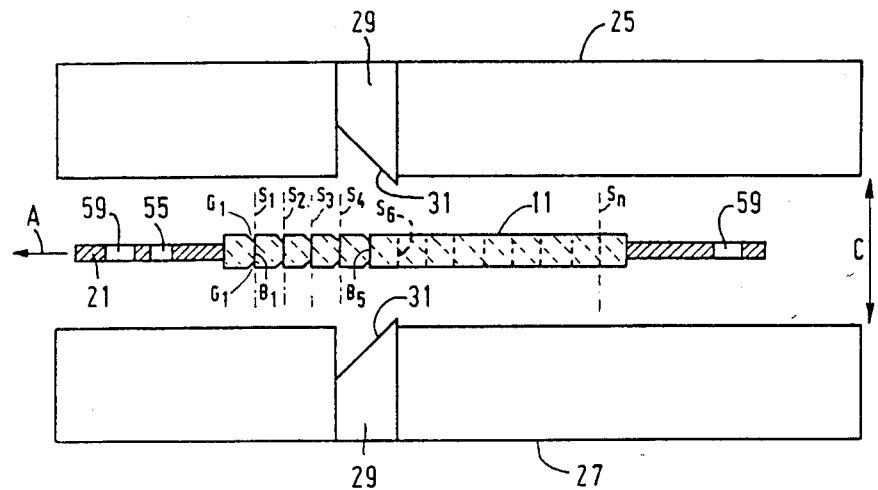
FIG. 5 shows diagrammatically how the method according to the invention is carried out.

The capacitor 1 shown in FIGS. 1 and 2 is of known construction and is composed of alternate layers of dielectric ceramic material 3 and of electrode material 5; successive electrode layers 5 extend alternately as far as one and as far as the other end face of the capacitor; as can be seen in FIG. 1, the electrode layers 5 do not extend as far as the longitudinal sides of the capacitor. Reference numeral 7 designates an electrically conducting layer on the end faces of the capacitor.

Such a multilayer ceramic capacitor is obtained in already known manner as follows; layers of electrode material are applied locally, for example, by screen printing, to sheets of dielectric ceramic material; the sheets provided with electrode layers are stacked and compressed to form a plate of laminated layers; subsequently, the plate is subdivided into separate capacitor elements in such a manner that successive electrode layers on opposite end faces of the capacitor elements are exposed; the capacitor elements are then sintered and are ultimately provided with an electrically conducting layer at the end faces. FIG. 3 shows in sectional view a plate 11 consisting of stacked and compressed sheets 13 of dielectric ceramic material, to which layers 15 of electrode material have been locally applied. Reference symbol S—S denotes division lines along which the plate 11 is to be subdivided into separate capacitor elements.

The invention more particularly relates to a method of subdividing the plate 11 into separate capacitor elements; the method will be described with reference to FIGS. 4 and 5.

FIGS. 4 and 5 show a plate 11 to be subdivided, which is arranged in a resilient frame 21 which is provided to this end with a central rectangular opening 23 substantially corresponding to the circumference of the plate 11. The frame 21 can be displaced stepwise in the direction of the arrow A. Reference numerals 25 and 27 designate two dies, which can be cyclically displaced relative to each other in the direction of the double arrow C. Each die is provided with an elongate notching member 29 with a notching edge 31. In order to subdivide the plate 11, the frame 21 is positioned so that the division line S1 is located in one perpendicular plane with the notching edges 31 of the notching members 29. Subsequently, the two dies 25 and 27 are moved towards each other with such a stroke length that a notch G1 is formed by the two notching edges 31 simultaneously on both sides of the plate 11. The stroke of the two dies 25 and 27 is adjusted so that the plate is notched on each side approximately to a depth of 10% of the overall thickness of this plate 11. By the notching process, a compressive stress is built up in the soft ceramic material which, when a given maximum is reached, leads to a spontaneous rupture B1 when a notch G1 is provided simultaneously on both sides of the plate 11, the rupture B1 is localized comparatively accurately. It will be appreciated that the length of the notching edges 31 is substantially equal to the dimension of the plate 11 along the division line S1. After the two dies 25 and 27 have returned to their starting position, the frame is displaced one step in the direction of the arrow A in such a manner that the division line S2 is located in the vertical plate of the notching edges 31. After all notches G1 to Gn have been provided along the division lines S1 to Sn, the plate 11 is notched along the division lines T1 to Tn in a direction at right angles to the first notches.

The frame 21 is provided with two resilient walls 33 and 35 which are located beside and at right angles to each other. These resilient walls are each constituted by an elongate wall portion 37 and 39, respectively, which faces the central opening 23 and which is connected via a central bridge portion 41 and 43, respectively, to a rib 45 and 47, respectively, acting as a spring; the ribs 45 and 47 are formed by and are limited by recesses 49, 51, 53, 55 and 57. Due to the resilient action of the walls 33 and 35, elongations of the plate 11 obtained due to the successive notches in a direction at right angles to the division lines are neutralized; moreover, the resilient walls hold the individual capacitor elements already separated from each other due to the spontaneously occurring ruptures together in a structure so that the plate 11 can be subdivided entirely and without disturbance. Reference numeral 59 denotes reference holes which are provided in the frame.

Figure 6:
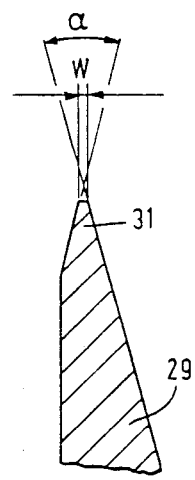
FIG. 6 shows on an enlarged scale the notching member in cross-section.

FIG. 6 shows on an enlarged scale the notching member 29. It has been found in practice that a satisfactory notching operation is obtained if the width W of the blunt notching edge 31 is at least 30 μm. Such an edge can be considered to be blunt and dull if the fact is taken into account that the separate ceramic layers have a thickness of about 50 μm and that the notches have a depth of 100 to 200 μm. In the embodiment shown the notching edge 31 has an angle α of approximately 30°.

Figure 7:
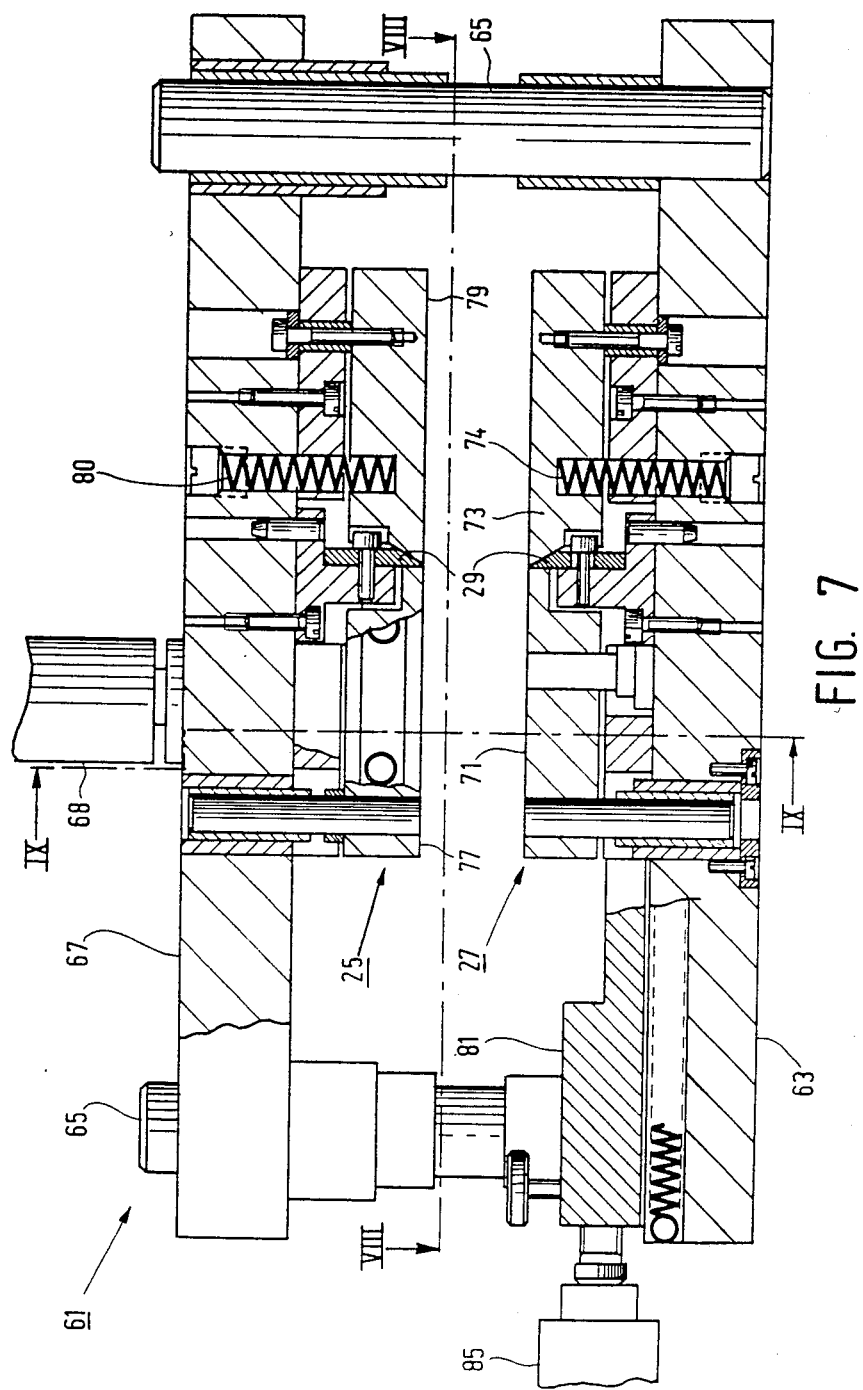
FIG. 7 shows in longitudinal sectional view a device according to the invention.
Figure 8:
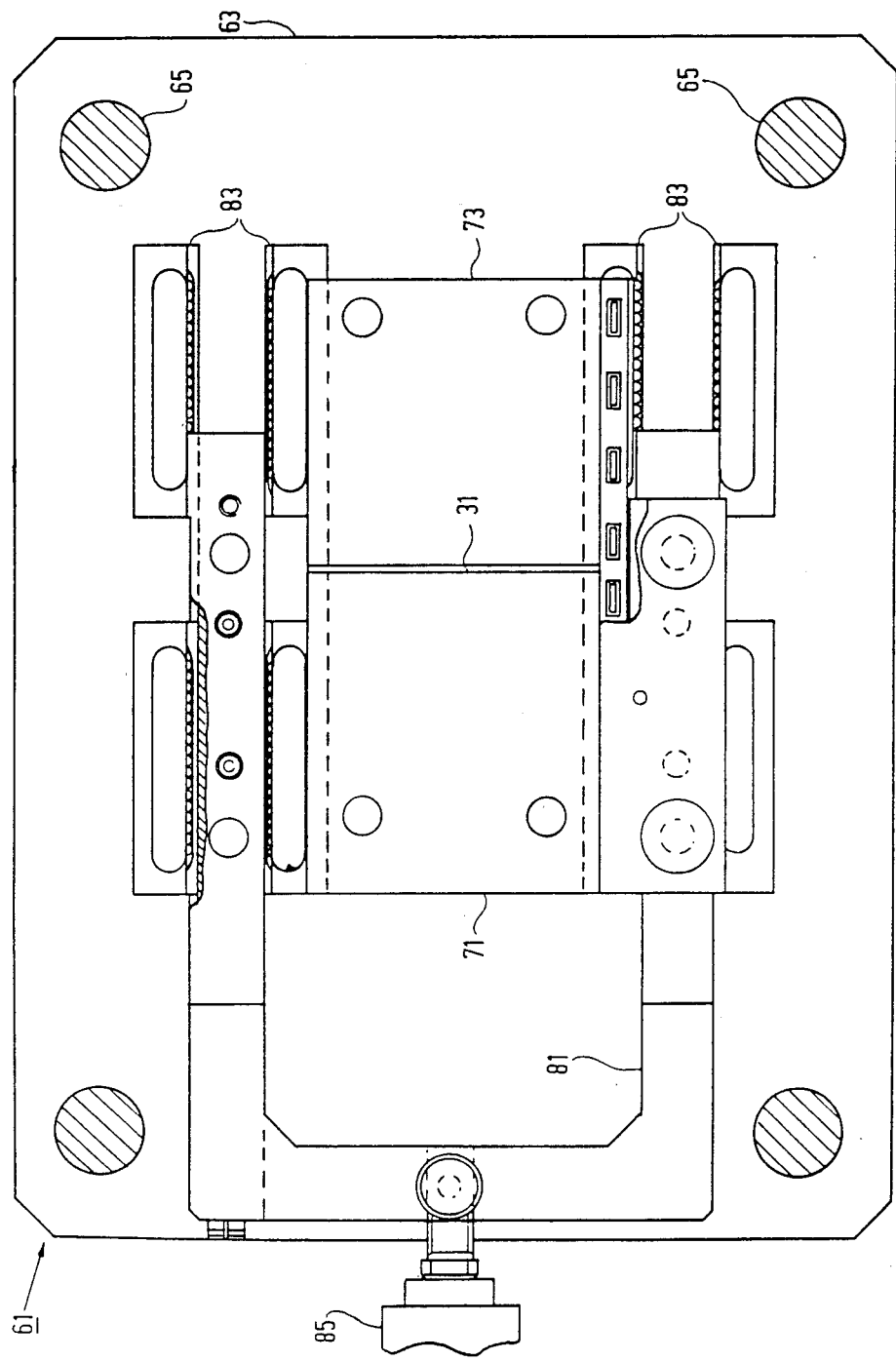
FIG. 8 is a plan view of the device taken on the line VIII—VIII in FIG. 7 and partly cut open.
Figure 9:
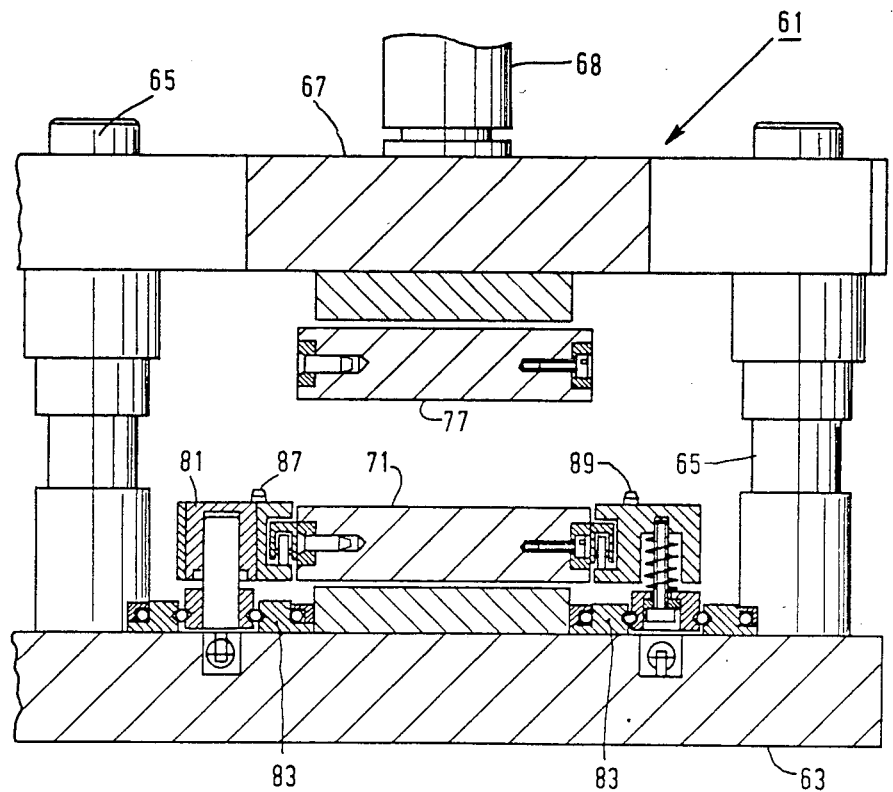
FIG. 9 shows the device in cross-section taken on the line IX—IX in FIG. 7.

FIGS. 7, 8 and 9 show in longitudinal sectional view, in plan view and in cross-section, respectively, a device according to the invention for carrying out the method already described. The device 61 comprises a bottom plate 63, which is journalled on a framework or a table not shown further. The bottom plate 63 has secured in it four guiding pillars 65 on which an upper sliding plate 67 is slidably journalled. By means of a unit 68, which may be hydraulic, pneumatic or the like, the sliding plate 67 can be displaced towards the bottom plate 63 and can be returned to the starting position. The lower die 27 consisting of two notching blocks 71 and 73 which are capable of performing a limited stroke with respect to the bottom plate 63 against the action of a spring 74 is mounted on the bottom plate 63. The two notching blocks 71 and 73 enclose the aforementioned notching member 29, which is fixedly secured to the bottom plate 63. In a similar manner, the sliding plate 67 is provided with the upper die 25 also consisting of two notching blocks 77 and 79 which are capable of performing in a similar manner a short stroke with respect to the sliding plate 67 against the action of a spring 80. The two notching blocks 77 and 79 also enclose a notching member 29 which is fixedly connected to the sliding plate 67. Reference numeral 81 designates a carriage which is U-shaped. The carriage 81 is slidably journalled on the bottom plate 63 by means of closed loop ball-bearings 83. By means of a drive 85, preferably a stepping motor, the carriage 81 can be displaced stepwise between the notching blocks 71, 73 and 77, 79. Reference numerals 87 and 89 designate reference pins which are provided on the carriage 81.

In order to carry out the method already described by the said device, the frame 21 together with a plate 11 to be subdivided is arranged on the carriage 81 and is positioned by means of the reference holes 59, which co-operate with the reference pins 87 and 89, so that one of the resilient walls 33, 35 of the frame 21, viewed in the transport direction, is located in the foremost position. Subsequently, the carriage 81 is brought into its starting position in such a manner that the first division line S1, as already explained, is located in one perpendicular plane with the notching edges 31 of the notching members 29. The sliding plate 67 is then moved downwards until the notching blocks 77 and 79 of the upper die 25 get into contact with the plate 11 to be subdivided; the sliding plate 67, the frame 21 with the plate 11, the notching blocks 71 and 73 of the lower die 27 and the carriage 81 perform a short downward stroke, while the notching blocks 77 and 79 of the upper die 25 perform a short upward stroke; due to these movements of the said parts, the plate 11 is firmly pressed between the notching blocks 71 and 73 of the lower die 27 on the one hand and the notching block 77 and 79 of the upper die 25 on the other hand; the notching edges 31 of the notching members 29, which are fixedly secured to the bottom plate 63 and to the sliding plate 67, respectively, are exposed, penetrate into the plate 11 and provide a rectilinear notch having a depth equal to the said short stroke of the notching blocks on both sides of the plate 11, which results in a spontaneous rupture through the thickness of the plate 11 along division line S1. The sliding plate 67 is moved upwards again and the notching blocks 71, 73 and 77, 79, respectively, return to their starting position. The carriage 81 is displaced one step over a distance equal to the relevant dimension of the capacitor elements to be separated. Subsequently, again a notch is provided on both sides of the plate 11 along the division line S2.

After all notches along the division lines S1 to Sn have been provided, in a further processing step notches are provided in a similar manner along the division lines T1 to Tn in a direction at right angles to the first notches. This second processing step can be carried out on the same device, the frame 21 then being rotated through an angle of 90°. Due to the resilient walls 33 and 35 of the frame 21, the latter can be lifted together with the already notched plate 11 off the carriage 81, can be rotated a quarter of a revolution and can be placed again on the carriage 81 without the plate 11 already notched and subdivided into strips falling apart. Alternatively, the frame 21 with the notched plate 11 may be passed in a direction at right angles to the first transport direction through a second similar device in such a manner that the frame 21 is located with the other resilient wall, viewed in the transport direction, in the foremost position.

After all notches have been provided, the plate 11 is removed from the frame 21; as a result, the plate 11 falls apart into the capacitor elements separately formed by notching. Subsequently, the capacitor elements are subjected to further necessary known treatments, such as sintering, silver-plating of the end faces, that is to say applying an electrically conducting layer to the end faces, and ultimately measuring.

It will be appreciated that the invention may be used in all those methods of manufacturing multilayer ceramic capacitors in which the green ceramic material is subdivided into separate capacitor elements already before sintering.

What is claimed is:

1. A method of manufacturing multilayer ceramic capacitors, in which electrode layers of electrode material are locally applied to sheets of dielectric ceramic material, the sheets provided with electrode layers are stacked and compressed to form a laminated plate and this plate is then subdivided into separate capacitor elements in such a manner that successive electrode layers are exposed at opposite end faces of the capacitor elements, after which the capacitor elements are sintered and are provided with an electrically conducting layer on the said end face, characterized in that the plate is subdivided into separate capacitor elements by notching the plate along division lines on both sides simultaneously in such a manner that along the notched division lines a spontaneous rupture occurs through the remaining thickness of the plate.

2. A method as claimed in claim 1, characterized in that the plate is notched on each side at most to a depth equal to 10% of the thickness of the plate.

3. A method as claimed in claim 1 or 2, characterized in that the plate is arranged in a resilient frame and is then notched stepwise in a first direction and subsequently in a second direction at right angles to the first direction, after which the capacitor elements thus obtained are removed from the resilient frame and are subjected to the subsequent operations.

* * * * *